US009088337B2

(12) United States Patent
Gan et al.

(10) Patent No.: US 9,088,337 B2
(45) Date of Patent: Jul. 21, 2015

(54) METHODS AND APPARATUSES FOR INTERFERENCE COORDINATION IN A TELECOMMUNICATIONS SYSTEM (75) Inventors: Jiansong Gan, Beijing (CN); Kimmo Hiltunen, Esbo (FI); Yin Liu, Beijing (CN); András Rácz, Budapest (HU); Zhang Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 594 days.

(21) Appl. No.: 13/392,697

(22) PCT Filed: Sep. 9, 2009

(86) PCT No.: PCT/EP2009/061696
§ 371 (c)(1),
(2), (4) Date: Feb. 27, 2012

(87) PCT Pub. No.: WO2011/029469
PCT Pub. Date: Mar. 17, 2011

(65) Prior Publication Data
US 2012/0156984 A1    Jun. 21, 2012

(51) Int. Cl.
H04B 1/00 (2006.01)
H04B 7/26 (2006.01)
H04B 7/155 (2006.01)
(Continued)

(52) U.S. Cl.
CPC .......... *H04B 7/2606* (2013.01); *H04B 7/15542* (2013.01); *H04L 5/0094* (2013.01); *H04W 72/04* (2013.01); *H04L 5/0073* (2013.01);
(Continued)

(58) Field of Classification Search
CPC . H04W 72/082; H04W 72/02; H04W 84/047; H04W 16/08; H04W 16/32; H04W 28/0236; H04W 28/08; H04W 36/00; H04W 36/0061; H04W 36/04; H04W 36/08; H04W 36/26
See application file for complete search history.

(56) References Cited

U.S. PATENT DOCUMENTS

2010/0008282 A1* 1/2010 Bhattad et al. ............... 370/312
2014/0036763 A1* 2/2014 Borran et al. ............... 370/315

FOREIGN PATENT DOCUMENTS

WO    WO 2008096240 A1 *  8/2008

OTHER PUBLICATIONS

3rd Generation Partnership Project. 3GPP TR 36.912, V2.0.0 (Aug. 2009). 3rd Generation Partnership Project; Technical Specification Group Radio Access Network; Feasibility study for Further Advancements for E-UTRA (LTE-Advanced) (Release 9).

(Continued)

*Primary Examiner* — Ajibola Akinyemi
(74) *Attorney, Agent, or Firm* — Murphy, Bilak & Homiller, PLLC (57) ABSTRACT The embodiments of the present invention relate to methods and apparatuses (600, 700) for coordinating interference in a telecommunications LTE based system. According to exemplary embodiments, an apparatus acting as a macro radio base station (eNB) (600) is configured to decide on what radio resources to schedule to its UEs and further decide on what resources to leave unutilized. Information on the decided resources is further transmitted in an interference coordinate signalling message, to at least one relay node (RN) (700) via at least one layer (1) control channel. The interference coordination signalling message will assist the RN (700) to make its own scheduling decision based on the information in the signalling message.

18 Claims, 7 Drawing Sheets

(51) Int. Cl.
*H04W 72/04* (2009.01)
*H04L 5/00* (2006.01)
*H04W 16/26* (2009.01)
*H04W 84/04* (2009.01)

(52) U.S. Cl.
CPC ............ *H04W 16/26* (2013.01); *H04W 72/042* (2013.01); *H04W 84/047* (2013.01)

(56) References Cited

OTHER PUBLICATIONS

3rd Generation Partnership Project. "On the Interference Coordination Intra-Cell Through R-PDCCH." 3GPP TSG RAN WG1 meeting #58, R1-093444, Shenzhen, China, Aug. 24-28, 2009.

* cited by examiner

401 — DECIDING ON SCHEDULED RESOURCES AND ON RESOURCES TO LEAVE UNUTILIZED

402 — TRANSMIT VIA L1 CONTROL CHANNEL AN INTERFERENCE COORDINATION SIGNALLING MESSAGE TO SUBORDINATE RN(S) INCLUDING INFO. ON DECIDED RESOURCES TO ASSIST RN(S) TO MAKE AN OWN SCHEDULING DECISION

FIGURE 4

501 — RECEIVE FROM DONOR eNB AN INTERFERENCE COORDINATION SIGNALLING MESSAGE, VIA L1 CONTROL CHANNEL, WITH INFORMATION ON DECIDED RESOURCES

502 — SCHEDULE RESOURCES BASED ON RECEIVED INFORMATION IN SIGNALLING MESSAGE

METHODS AND APPARATUSES FOR INTERFERENCE COORDINATION IN A TELECOMMUNICATIONS SYSTEM

TECHNICAL FIELD

The present invention relates generally to the field of mobile or wireless communications network systems, and, more specifically, to methods and apparatuses for interference coordination in a wireless telecommunications system.

BACKGROUND

The $3^{rd}$ generation partnership project (3GPP) is responsible for the standardization of the universal mobile telecommunication service (UMTS) system, and long term evolution (LTE) is now under discussion as a next generation mobile communication system of the UMTS system. LTE is a technology for realizing high-speed packet-based communication that can reach data rates of about 100 Mbps on the downlink and about 50 Mbps on the uplink. To this end, schemes and mechanisms are being specified, for example, a scheme to reduce the number of network nodes in conventional UMTS networks. As an example, the macro radio base station in LTE, also known as an enhanced Node B (eNB) or eNodeB will perform the functions of a conventional Radio Access Network (RNC) node and of a UMTS Node B. In addition, eNodeBs in LTE will interact directly with the core network and with other eNodeBs.

An enhancement to LTE, which is also being studied by 3GPP, is known as LTE-advanced. LTE-advanced can reach much higher data rates than the ones used in LTE and an improved coverage. LTE-advanced can also support wider bandwidth as compared to LTE. LTE-advanced is an evolution to LTE and is thus backward compatible with LTE.

In order to improve the coverage of high data rates, group mobility, temporary network deployment, cell edge throughput and/or to provide coverage in new areas, the use of relay nodes (RN) is considered for LTE-advanced. RNs can be deployed in the coverage cell area of a macro radio base station i.e. of a eNB to improve quality and coverage of a network at cell edge where e.g. users or user equipments (UEs) are furthest from eNB.

Although relaying improves the coverage of the eNB, there could be significant interference between the eNB and its subordinate RNs i.e. RNs that are served by the eNB. In the 3GPP technical document denoted R1-090370 and entitled: "*Initial Evaluation of Relay Performance*" available on the Internet, it is observed that the access link from a low power RN to a UE is significantly limited by the dominant interference from neighboring macro cells. To cope with strong interference between a macro cell and its subordinate RNs, a so-called cooperative silencing can be used as disclosed in the 3GPP technical document cited above. The basic idea of cooperative silencing is to mute macro eNBs in those (pre-configured) sub-frames where RNs are supposed to communicate with their subordinate UEs. A similar scheme named time division multiplexing (TDM) muting was also proposed in a 3GPP technical document R1-091347 entitled: "*Relay Impact on LTE System Performance*". A drawback with cooperative silencing and/or TDM muting is that less efficient resource usage is experienced. This is the case for e.g. UEs that can afford some interference i.e. UEs that are close to relays or eNBs.

One way to improve the efficiency in resource usage is to use a scheme known as inter-cell interference coordination (ICIC) instead of using cooperative silencing or TDM muting. The basic idea of ICIC is to apply restrictions to the downlink/uplink resource management in a coordinated way between cells. The restrictions can be in the form of restrictions of what time/frequency resources are available to the resource manager or restrictions on the transmit power that can be applied to certain time/frequency resources. Such restrictions in a cell provide the possibility for improvement in signal to interference ratio (SIR) and cell-edge data rates and/or coverage on the corresponding time/frequency resources in a neighbor cell. In LTE, the standardized X2 interface is available for conveying interference coordination messages, e.g. ICIC messages, between eNBs. However, the messages available on the X2 interface are not suitable for fast coordination on the scheduling time frame partly because of the typical X2 delay characteristics, which are larger than the scheduling interval periodicity of 1 ms, and because of the original design intention of these messages, which targeted a longer time-scale coordination which is longer that the scheduling periodicity. It should be noted that for type-1 RNs which are defined as in-band relay nodes characterized by a serial of characteristics e.g. having its own cell ID, its own scheduler etc., the interference coordination signalling messages i.e. ICIC between type-1 RN and macro eNBs can be exchanged via the X2 interface. However, as mentioned above, the messages available on the X2 interface are not suitable for fast interference coordination because of the delay characteristics of the X2 interface.

SUMMARY

It is thus an object of the exemplary embodiments of the present invention to address the above mentioned problems and to provide methods and apparatuses corresponding to a macro radio base station and to a relay node respectively, that allows fast, effective and improved coordination of the interference between macro radio base stations and relay nodes.

According to a first aspect of embodiments of the present invention, the above stated problem is solved by means of a method for use in a macro radio base station, for coordinating interference between the macro radio base station and one or more relay nodes served by the macro radio base station. The macro radio base station and the relay node(s) communicate with each other via at least one predefined layer 1 (L1) control channel. The method comprises: deciding on what radio resources to schedule to one or more UEs served by the macro radio base station and further deciding on what radio resources to leave unutilized; transmitting to the one or more relay nodes, via the at least one predefined L1 control channel, an interference coordination signalling message comprising information on the decided radio resources i.e. information on both the scheduled resources and the unutilized radio resources to assist the relay nodes to make an own scheduling decision based on the information in the interference coordination signalling message.

As an example, the macro radio base station decides on what resource blocks to schedule to its subordinate UEs and further decides on what resource blocks to leave unutilized or what resource blocks that are available for scheduling by the relay node(s) and then transmits, on at least one L1 control channel, an interference coordination signalling message comprising information on the decided resource blocks to assist its subordinate relay node(s) to make an own scheduling decision based on the information in the interference coordination signalling message.

The L1 control channel can be the relay-physical downlink control channel (R-PDCCH) and/or the physical broadcast channel (PBCH).

According to another aspect of embodiments of the present invention, the above stated problem is solved by means of a method for use in a relay node for coordinating interference between the relay node and at least one macro radio base station serving said relay node and wherein the relay node and the at least one macro radio base station are configured to communicate with each other via at least one predefined L1 control channel. The method comprises: receiving, via the at least one predefined L1 control channel, an interference coordination signalling message comprising information on what radio resources that the macro radio base station decided to schedule to one or several UEs served by the macro radio base station and further comprising information on what radio resources that the macro radio base station decided to leave unutilized. The method further comprises scheduling radio resources to UEs served by the relay node, based on the information received in the interference coordination signalling message.

According to yet another aspect of embodiments of the present invention, the above stated problem is solved by means of a macro radio base station for coordinating interference between the macro radio base station and at least one relay node served by the macro radio base station and wherein said at least one relay node and the macro radio base station are configured to communicate with each other via at least one predefined L1 control channel. According to this aspect, the macro radio base station comprises a scheduler configured to decide on what radio resources to schedule to at least one UE served by the macro radio base station and further configured to decide on what radio resources to leave unutilized or in other words what resources that are available for scheduling by the relay node(s). The macro radio base station further comprises a transmitter configured to transmit to said at least one relay node, via said at least one predefined L1 control channel, an interference coordination signalling message comprising information on said decided radio resources to assist said at least one relay node to make an own scheduling decision based on the information in the interference coordination signalling message.

According to a further aspect of embodiments of the present invention, there is provided a relay node for coordinating interference between the relay node, and at least one macro radio base station serving said relay node and wherein said relay node and said at least one macro radio base station are configured to communicate with each other via at least one L1 control channel. According to this aspect, the relay node comprises a receiver configured to receive, via said at least one predefined L1 control channel, an interference coordination signalling message comprising information on what radio resources that the macro radio base station decided to schedule to at least one UE served by the macro radio base station and further comprising information on what radio resources that the macro radio base station decided to leave unutilized. The relay node further comprises a scheduler configured to schedule radio resources to UEs served by the relay node, based on the information received in the interference coordination signalling message.

An advantage of the exemplary embodiments of the present invention is to realize a flexible and efficient interference coordination as compared to X2-based ICIC schemes.

Still other advantages, objects and features of the embodiments of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent from the following that the present invention and its embodiments may be practiced in other embodiments that depart from these specific details.

The exemplary embodiments of the present invention are described herein by way of reference to particular example scenarios. In particular the invention is described in a non-limiting general context in relation to a LTE based system e.g. LTE-Advanced wherein macro radio base stations e.g. eNBs and relay nodes are employed. It should be noted that the present invention and its exemplary embodiments may also be applied to other types of radio technologies and architectures employing macro radio base stations and relay nodes.

Figure 1:
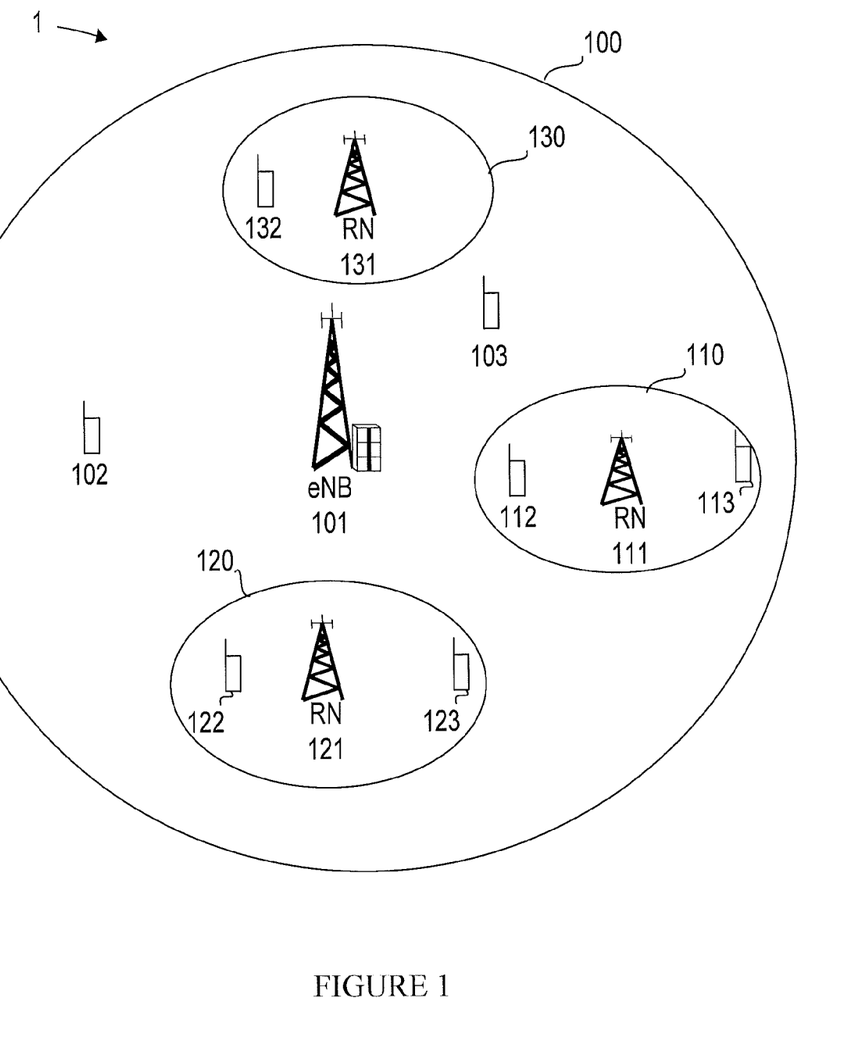
FIG. 1 is a simplified block diagram illustrating an exemplary wireless telecommunications network wherein the exemplary embodiments of the present invention may be used.

Referring to FIG. 1 there is illustrated a block diagram of and exemplary LTE based network system 1 wherein exemplary embodiments of the present invention may be applied. Note that the system 1 depicted in FIG. 1 only shows transceivers or nodes that are necessary for understanding the different exemplary embodiments of the present invention. As shown, the LTE based system 1 which may for example be a LTE Rel-8 and/or LTE Rel-10 system comprises a number of user equipments (UEs), apparatuses acting as macro radio base stations (eNBs), only one eNB is shown here, and relay nodes (RNs). eNB 101 is shown serving a coverage area 100; RN 111 has a coverage area 110; RN 121 has a coverage area 120 and RN 131 has a coverage area 130. One of the functions of the eNBs is to control traffic to and from UEs in a cell. A UE is suitable to be used as a mobile phone, a wireless terminal, a laptop, a personal computer, a personal digital assistant, a voice over internet protocol (VoIP) capable phone or any other 3GPP LTE capable equipment. Traffic, over a radio link, from a eNB to a UE is referred to as downlink (DL) traffic and traffic, over a radio link, from the UE to the eNB is referred to as uplink (UL) traffic. Traffic over a radio link, from RN to the UE is also referred to as downlink (DL) traffic and traffic, over a radio link, from the UE to the RN is referred to as uplink (UL) traffic. Also shown in FIG. 1 is that UE 112 and 113 are within the coverage area of RN 111; UEs 122 and 123 within the coverage area of RN 121 and UE 132 within the coverage area of RN 131. UE 102 and UE 103 are not within the coverage area of any of the RNs. Note that in FIG. 1, the number of UEs, eNBs and RNs and the locations of the UEs are only illustrative and the exemplary embodiments of the present invention are not restricted to the scenario depicted in FIG. 1.

The RNs depicted are considered to represent type-I relay nodes meaning that they are in-band RNs characterized by a serial of characteristics e.g. having its own cell identity (ID), having its own scheduler etc. As RNs are deployed within the coverage area 100 of eNB 101, there could be significant interference between eNB 101 and its subordinate RNs 111, 121 and 131. To cope with the interference and according to exemplary embodiments of the present invention, the eNB 101 is configured to decide on what radio resources e.g. resource blocks, time/frequencies etc. to schedule to at least one UE, e.g. UE 102 and UE 103, served by eNB 101 and also to decide on what resources to leave unutilized i.e. resources that are not used for scheduling by the eNB 101. The decision can be based on system load, UE distribution, positions of RNs in the coverage area of eNB 101, traffic of neighboring eNB(s) etc. After the decision making, the eNB 101 is configured to transmit to its subordinate RN(s), an interference coordination signalling message comprising information on the decided radio resources. This will assist the RN(s) in making an own scheduling decision based on the information in the interference coordination signalling message. According to exemplary embodiments of the present invention, the interference coordination signalling message is transmitted to the RN(s) via at least one L1 control channel.

According to an exemplary embodiment of the present invention, a relay physical downlink control channel (R-PDCCH) representing a L1 control channel, can be used to transmit the interference coordination signalling message. According to another exemplary embodiment of the present invention, a physical broadcast downlink channel (PBCH) representing a L1 control channel, can be used to transmit the interference coordination signalling message. According to yet another exemplary embodiment of the present invention, some part of the interference coordination signalling message can be transmitted via R-PDCCH and some other part is transmitted via the PBCH. The eNB 101 can thus select which control channel to use to transmit the signalling message or can select to transmit the signalling message via the two L1 control channels. Thus, the layer interface used to transmit the interference coordination signalling message is a lower layer as compared to the X2 interface which is a higher layer that is not suitable for conveying control signalling capabilities of the lower layers. With the use of the lower layer(s) in accordance with the exemplary embodiments of the present invention, for conveying the interference coordination signalling message, delays are reduced as compared to if the X2 interface is used.

According to an exemplary embodiment of the present invention, the eNB can select to transmit the interference coordination signalling message via either the R-PDCCH, or via the PBCH, if the same interference coordination signalling message is to be transmitted to a plurality of subordinate relay nodes that are served by the eNB. This is the case e.g. when the eNB does not use beamforming.

Figure 2:
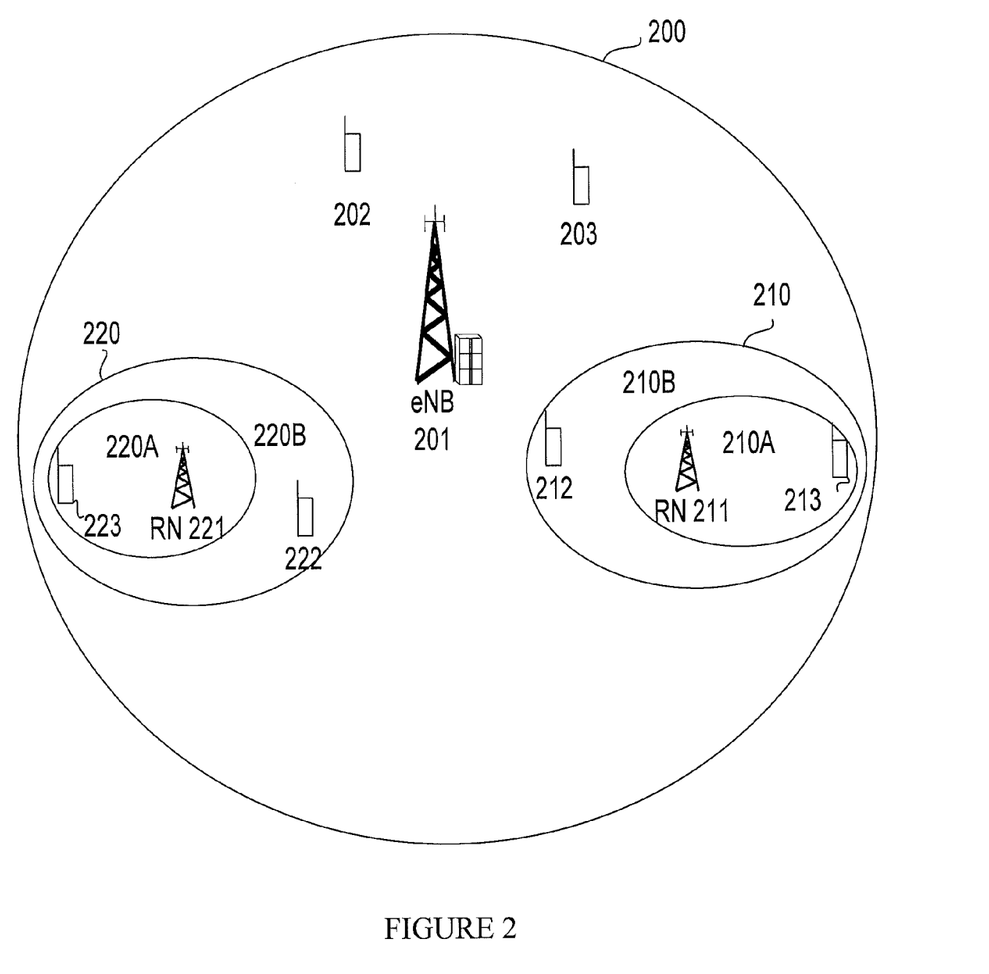
FIG. 2 is a scenario in a network wherein exemplary embodiments of the present invention may be applied.

FIG. 2 illustrates an exemplary scenario where beamforming is not used. As shown, eNB 201 has coverage area 200, RN 211 has coverage area 210 and RN 221 has coverage area 220. UEs 212 and 213 are within coverage area 210 and UEs 212 and 213 are within coverage area 220. UEs 202 and 203 are not considered within the coverage area of anyone of the RNs 211 and 221. In this example, the information in the interference coordination signalling message, regarding the unutilized or muted radio resources, can assist RNs 211 and 221 to allocate the muted/unutilized resources to anyone of the UEs served by the respective RNs 211 and 221. It should be noted that UEs at boundaries of the cell served by a RN, denoted here relay cell boundaries, may have higher priority to use the unutilized/muted resources as compared to UEs located in the inner part of the relay node coverage area of the inner part of the relay cell. The RNs 211 and 221 may also use the information in the coordination signalling message regarding the radio resources scheduled by the eNB 201, to allocate the un-muted resources scheduled by the eNB to UEs which are close to the RNs 211 and 221 respectively, i.e. not at the RN cell boundaries. Each RN can determine which UEs are close to it based on UE measurement reports received from the UEs in the RN cell.

As further illustrated in FIG. 2, this means that for UEs 213, subordinate to RN 211, that are located within relay cell sub-area 210A the RN 211 may decide to schedule the UEs 213 to radio resources that are also scheduled by the eNB 201 to its subordinate UEs 202, 203 or to radio resources that are left unutilized/unscheduled by the eNB 201 and/or that are indicated as unutilized/muted radio resources by the eNB 201 in the interference coordination signalling message. Further, for UEs 212, subordinate to RN 211, that are located within relay cell sub-area 210B the RN 211 may decide to schedule the UEs 212 to radio resources that are left unutilized/unscheduled by the eNB 201 and/or that are indicated as unutilized/muted radio resources by the eNB 201 in the interference coordination signalling message.

It is also shown in FIG. 2 that for UEs 223, subordinate to RN 221, that are located within relay cell sub-area 220A the RN 221 may decide to schedule the UEs 223 to radio resources that are also scheduled by the eNB 201 to its subordinate UEs 202, 203 or to radio resources that are left unutilized/unscheduled by the eNB 201 and/or that are indicated as unutilized/muted radio resources by the eNB 201 in the interference coordination signalling message. Further, for UEs 222, subordinate to RN 221, that are located within relay cell sub-area 220B the RN 221 may decide to schedule the UEs 222 to radio resources that are left unutilized/unscheduled by the eNB 201 and/or that are indicated as unutilized/muted radio resources by the eNB 201 in the interference coordination signalling message. The eNB 201 is also configured to allocate scheduled radio resources to UEs that are served by the eNB 201 i.e. UEs not located within the coverage areas of RNs 211 and 221.

It should be noted that if the eNB 201 selects to transmit the interference coordination signalling message via PBCH, then both RNs 211 and 221 can receive this message since the signalling message is broadcasted. An advantage with using PBCH is that the signalling overhead can be reduced since as mentioned, the eNB 201 only needs to transmit the signalling message once through broadcasting, and all RNs can then receive the message.

However, if the PBCH is limited in capacity or if it is not fast enough or if a more dynamic coordination is needed, the signalling message can be sent to RNs 211 and 221 via the R-PDCCH. The R-PDCCH can be viewed as a channel used for relay-specific coordination between relays and their donor eNB 201, and the PBCH can be viewed as a channel for eNB-specific interference between relays and their donor eNB 201. By donor eNB 201 is means the eNB 201 having its subordinate RNs 211 and 221

Note also that the eNB 201 can also select to transmit the interference coordination signalling message via the PBCH if the R-PDCCH is judged to be limited in capacity or is not fast enough.

According to an exemplary embodiment of the present invention, the eNB 201 can adjust the set of unutilized/muted radio resources based on feedback from the RN 211 and/or from RN 221. An example of feedback information from a RN is how many UEs that will receive significant interference if the eNB transmits according to the previously decided radio resources. By decided radio resources is meant information on what resources are scheduled by the eNB and what resources that are left unutilized by the eNB. The eNB can, in this case, adjust the set of muted radio resources for it subsequent decision(s) in order to further reduce the amount of interference. This way, dynamic or semi-dynamic interference coordination is achieved.

According to another exemplary embodiment of the present invention, the eNB 201 can also indicate in the interference coordination signalling message, a level of transmission power on each scheduled radio resource and/or a level of interference that can be tolerated or that is caused on said scheduled radio resources. This will assist the RN(s) 211 and/or 221 to improve its scheduling in order to avoid generating unnecessary interference between it and the donor eNB 201.

The eNB 201 may also schedule low interfering UEs i.e. UEs close to the eNB in the "muted" part, i.e. to radio resources that are also scheduled by the RNs to anyone of its subordinate UEs, with less transmission power which can be determined based on UE measurement reports in donor cell of the eNB. This will lead to a more efficient usage of radio resources. Note also that the above described exemplary embodiment of the present invention is equally applicable for interference coordination in the uplink and downlink directions.

The eNB may further include, in the interference coordination signalling message not only the range or set of resource blocks (or subframes) that may be impacted but also a time span over which the interference information in the interference coordination signalling message applies. Furthermore, the interference coordination signalling message may also indicate other parameters such as used or recommended pre-coding matrix and/or transport format.

Figure 3:
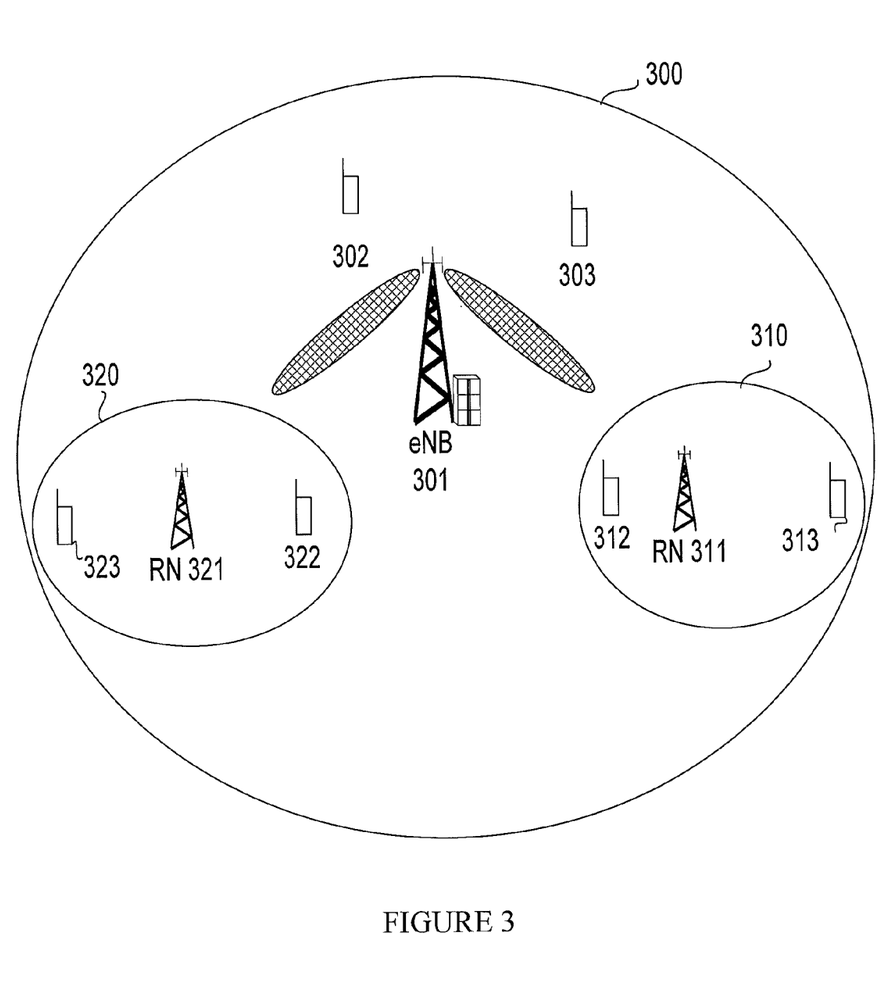
FIG. 3 is another scenario in a network wherein exemplary embodiments of the present invention may be applied.

Referring to FIG. 3 there is illustrated another exemplary scenario wherein exemplary embodiments of the present invention can be applied. In this scenario, the eNB 301 is assumed to use beamforming. The eNB 301 with coverage area 300 may thus use beamforming to transmit to its subordinate UEs 302 and 303 and to its subordinate RNs 311 having coverage area 310 and/or RN 321 having coverage area 320 as schematically depicted in FIG. 3. UEs 312 and 313 are within coverage area 310 of RN 311 and UEs 322 and 323 are within coverage area 320 of RN 321. In this scenario, the interference becomes directional. Hence, some relay nodes/cells may suffer interference while some other relay cells suffer less or no interference. In such a scenario, the eNB 301 copes with the interference by transmitting different interference coordination signalling messages to different relays. As an example, the eNB 301 can indicate in the interference coordination signalling message a scheduling restriction to an interfered RN and/or an unrestricted scheduling command to an un-interfered RN.

The interference coordination signalling message is, in this scenario, relay-node-specific and can therefore not be sent via PBCH. Instead, it has to be sent via R-PDCCH. Thus if the interference coordination signalling message is different for different RNs and/or if the interference coordination signalling message changes fast i.e. according to a scheduling time scale, the R-PDCCH is used to send the signalling message. This will assist the different RNs to make an own scheduling decision to its subordinate UEs as previously described i.e. by scheduling scheduled/un-muted resources to UEs close to the RN and scheduling unutilized/muted resources to anyone of the UEs in the cell area of the RN. Preferably, the UEs at relay cell boundary have higher priority to use the set of muted resources indicated in the signalling message.

Also in this scenario, the eNB can adjust the set of unutilized radio resources based on feedback received from the RN(s). Furthermore, the eNB can indicate in the interference coordination signalling message, a level of transmission power on each scheduled radio resource and/or further indicate a level of interference that can be tolerated or that is caused on said decided radio resources. Similarly to the previously described embodiment of the present invention, the signalling message can indicate a range of radio resources, e.g. resource blocks, impacted and in addition can indicate a time span over which the interference information in the interference coordination signalling message applies and further indicate at least one transmission parameter including information about used or recommended pre-coding matrix and/or transport format.

It should be noted that in the beamforming scenario, the eNB can decide not to mute any of the radio resources. However, the eNB has to use the R-PDCCH to send the interference coordination signalling message to it subordinate RNs. The format of the signalled information may be similar as the known format of the scheduling assignment in the PDCCH, especially when interference coordination is signalled on R-PDCCH. The information may be carried in a control information format that is separate from the one to be used for signalling scheduling assignments on the backhaul link or the information may be combined into the same scheduling assignment format.

As previously described, whether to send the interference coordination signalling message on R-PDCCH or on PBCH can be determined by:
  if the message is relay node specific and/or if the signalling message changes fast, i.e. according to scheduling time scale, then the R-PDCCH is used.
  If the PBCH is limited in capacity or is not fast enough, then R-PDCCH is used.
  If R-PDCCH is limited in capacity or is not fast enough, then the PBCH is used to carry non-relay node specific information to reduce signalling overhead.

As mentioned earlier, the exemplary embodiments of the present invention are not restricted to only using R-PDCCH or only using PBCH i.e. some part of the interference coordination signalling message can be sent via R-PDCCH and other part of the same message can be sent via PBCH.

As mentioned earlier, the L1 control channel (R-PDCCH and/or the PBCH) comprising the interference coordination signalling message is conveyed via the physical (PHY) layer and can further be performed at sub-frame level(s), which is typically of 1 ms and thus does not suffer the same delays that are characteristics of the X2 interface. It should be mentioned that the delay characteristic of the X2 interface is generally larger than 1 ms. Note also that since the X2 interface is a higher layer interface, i.e. layer 3 (L3) interface, it cannot take advantage of the control signalling capabilities of the lower layers (i.e. L1 and L2), as it has not been designed for a radio link but for wired transport network links.

Figure 4:
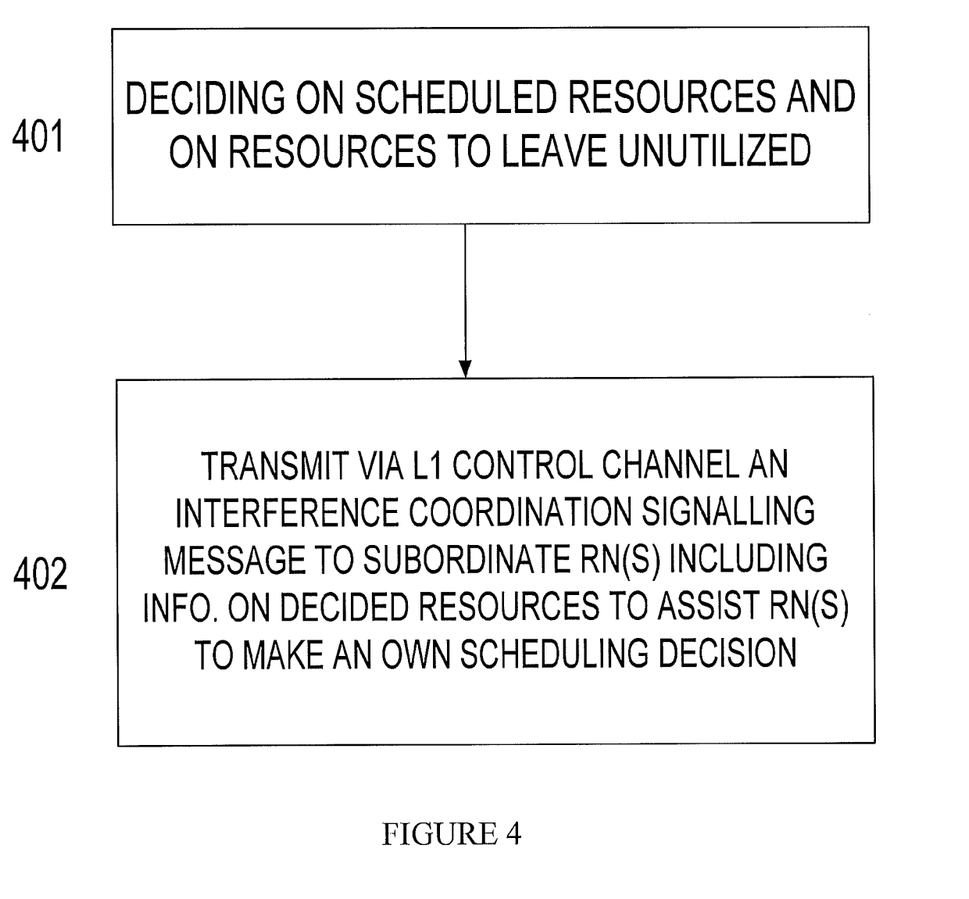
FIG. 4 is a diagram illustrating a flowchart of a method for use in a macro radio base station, according to exemplary embodiments of the present invention.

Referring to FIG. 4 there is illustrated the main steps of the method or procedure, in a macro radio base station i.e. eNB, for coordinating interference between the eNB and it subordinate RNs. As shown in FIG. 4, the main steps of the method comprise:

(401) deciding on what radio resources to schedule to UEs served by the eNB, i.e. to its subordinate UEs, and further deciding on what radio resources to leave unutilized i.e. unscheduled.

(402) transmitting, via at least one L1 control channel (i.e. R-PDCCH and/or PBCH), an interference coordination signalling message comprising information on the decided radio resources i.e. scheduled and unscheduled resources in order to assist the RN(s) to make an own scheduling decision based on the information in the interference coordination signalling message;

Additional exemplary embodiments regarding the reason for choosing a type of L1 control channel and what additional information that can be included in the signalling message etc. have already been presented and are therefore not repeated again.

Figure 5:
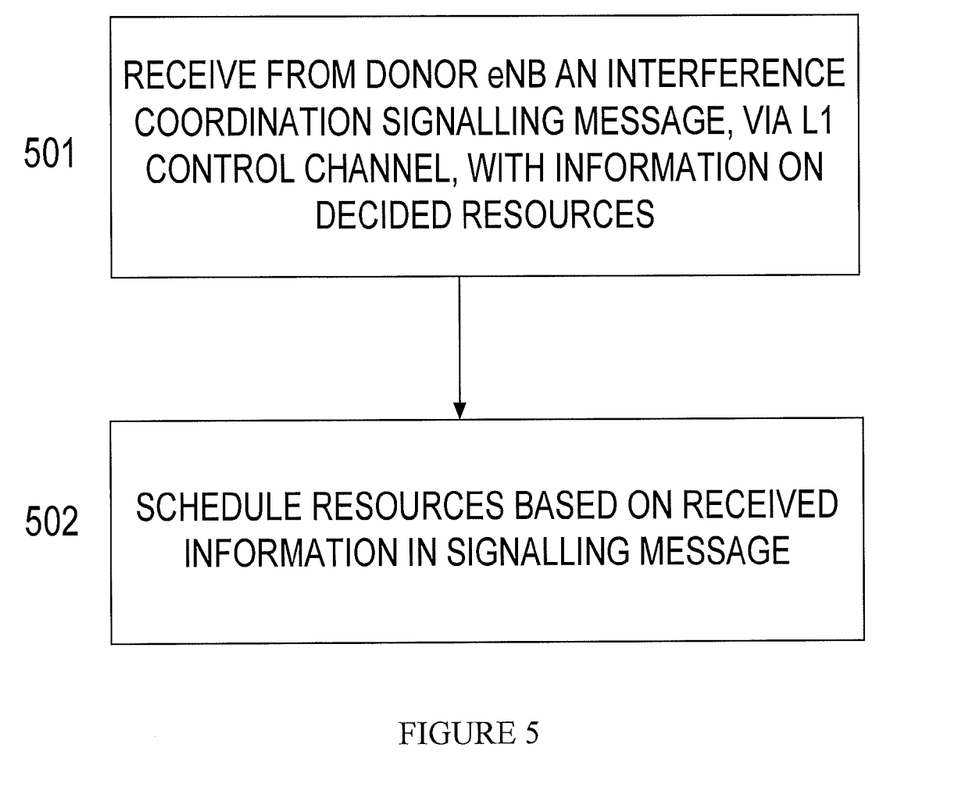
FIG. 5 is a diagram illustrating a flowchart of a method for use in a relay node, according to exemplary embodiments of the present invention.

Referring to FIG. 5 there is illustrated the main steps of the method or procedure, in a RN, for coordinating interference between the RN and a eNB serving the RN i.e. a donor eNB. As shown in FIG. 5, the main steps of the method comprise:

(501) receiving, via at least one L1 control channel, an interference coordination signalling message comprising information on what radio resources that the eNB decided to schedule to at least one of its subordinate UE, and further comprising information on what radio resources that the eNB decided to leave unutilized i.e. unscheduled;

(502) scheduling radio resources to at least one of the UEs served by the RN, based on the information received in the interference coordination signalling message.

As previously described the RN can allocate the scheduled radio resources to anyone of its UEs that are close to the RN, and further allocate the unutilized radio resources to anyone of the UEs in the coverage area of the RN. Additional functions of the RN have already been presented and are therefore not repeated again.

Figure 6:
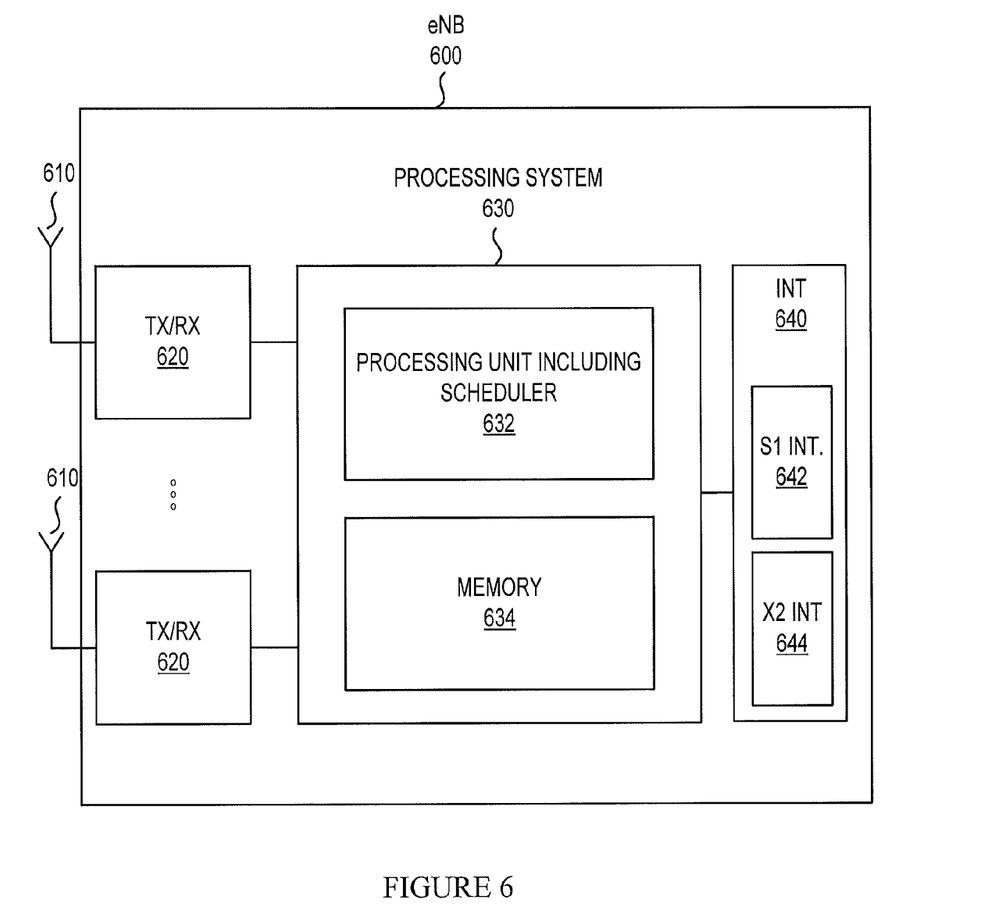
FIG. 6 illustrates a block diagram of an exemplary macro radio base station (eNB) according to exemplary embodiments of the present invention.

Referring to FIG. 6 there is illustrated a block diagram of an exemplary macro radio base station 600, e.g., eNB for coordinating interference between itself and subordinate RNs by means of at least one predefined L1 control channel. Exemplary components of eNB 600 are shown. As illustrated, eNB 600 may include antennas 610, transceivers 620, a processing system 630, and an interface 640. Antennas 610 may include one or more directional and/or omni-directional antennas. Transceivers 620 may be associated with antennas 610 and include transceiver circuitry for transmitting and/or receiving symbol sequences in a network via antennas 610. Processing system 630 may control the operation of eNB 600. Processing system 630 may also process information received via transceivers 620 and interface 640. As illustrated, processing system 630 may include processing logic/unit 632 and a memory 634. It will be appreciated that processing system 630 may include additional and/or different components than illustrated in FIG. 6. Processing logic/unit 632 may include a processor, microprocessor, an application specific integrated circuit (ASIC), a field-programmable gate array (FPGA), or the like. Processing logic/unit 632 may process information received via transceivers 620 and interface 640. The processing logic/unit 632 may also act or include a scheduler which is configured, in accordance with exemplary embodiments of the present invention, to decide on what radio resources to schedule to UE(s) served by the eNB 600 and to further decide on what radio resources to leave unutilized or unscheduled. The eNB transceiver 620 e.g. one or more transmitters/receivers or transceivers TX/RX in combination with antenna(s) is configured to transmit, via at least one L1 control channel (not shown), an interference coordination signalling message, to its subordinate RN(s) and to include in the message information on the decided radio resources i.e. scheduled and unscheduled resources in order to assist the RN(s) to make an own scheduling decision. Additional functions and operations of the eNB, in accordance with the exemplary embodiments of the present invention, have already been described and are therefore not repeated.

It should however be noted that the processing may include, for example, data conversion, forward error correction (FEC), rate adaptation, quadrature phase shift keying (QPSK) modulation etc. In addition, processing logic/unit 632 may generate additional messages, e.g. control messages and/or data messages, and cause those control messages and/or data messages to be transmitted via transceivers 620 and/or interface 640. Processing logic/unit 632 may also process control messages and/or data messages received from transceivers 620 and/or interface 640. Memory 634 may include a RAM, a ROM, and/or another type of memory to store data and instructions that may be used by processing logic/unit 632.

Interface 640 may include one or more line cards that allow eNB 600 to transmit data to and receive data from other devices or nodes over wired and/or wireless connections. As illustrated, interface 640 may include an S1 interface 642 that allows eNB 600 to communicate, for example, with a MME/GW (Mobility Management Entity/Gateway), and an X2 interface 644 that allows eNB 600 to communicate with another eNB. eNB 600 may perform certain operations in response to processing logic/unit 632 executing software instructions contained in a computer-readable medium, such as memory 634. A computer-readable medium may be defined as one or more physical and/or logical memory devices. The software instructions may be read into memory 634 from another computer-readable medium or from another device via interface 640. The software instructions contained in memory 634 may cause processing logic/unit 632 to perform processes described herein. Alternatively, hardwired circuitry may be used in place of or in combination with software instructions to implement processes/function/method described herein. Thus, embodiments described herein are not limited to any specific combination of hardware circuitry and software.

Although FIG. 6 shows exemplary components of eNB 600, in other implementations, eNB 600 may contain fewer, different, or additional components than depicted in FIG. 6. In still other implementations, one or more components of eNB 600 may perform the tasks described as being performed by one or more other components of eNB 600.

Figure 7:
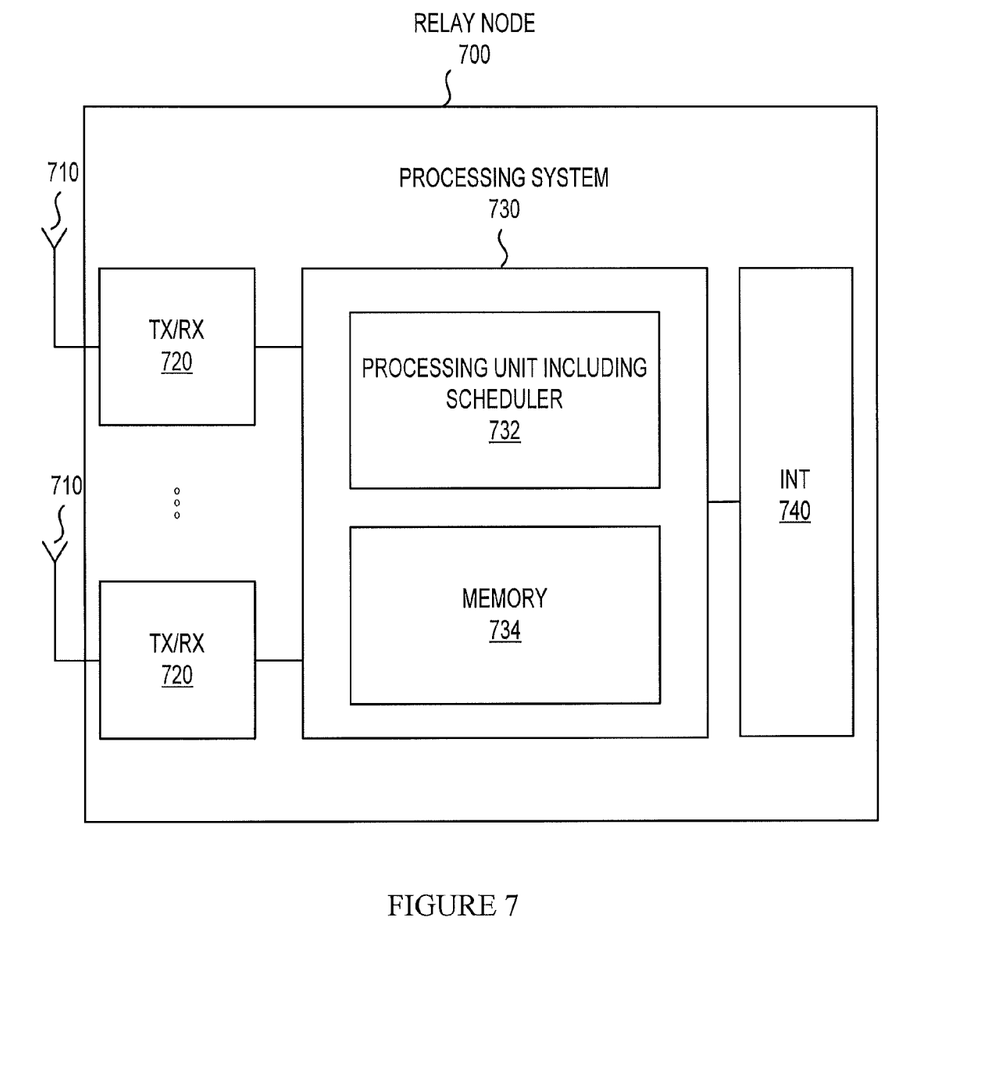
FIG. 7 illustrates a block diagram of an exemplary relay node (RN) according to exemplary embodiments of the present invention.

Referring to FIG. 7 there is illustrated a block diagram of an exemplary relay node (RN) 700 for coordinating interference between itself and its donor eNB by means of at least one predefined L1 control channel. Similarly to eNB 600 of FIG. 6, the RN 700 also includes one or several antennas 710, transceivers 720 (TX/RX), a processing system 730, and an interface 740. Antennas 710 may include one or more directional and/or omni-directional antennas. Transceivers 720 may be associated with antennas 710 and include transceiver circuitry for transmitting and/or receiving symbol sequences in a network via antennas 710. Processing system 730 may control the operation of RN 700. Processing system 730 may also process information received via transceivers 720 and interface 740. According to embodiments of the present invention, the receiver of the transceiver 720 is configured to receive, via at least one L1 control channel, an interference coordination signalling message comprising information on what radio resources that the donor eNB decided to schedule to at least one user equipment, UE, served by the eNB and further comprising information on what radio resources that the eNB decided to leave unutilized. The processing unit/logic 732 of the processing system 730 may act as or may include a scheduler configured to schedule radio resources to UEs served by the RN 700, based on the information received in the interference coordination signalling message.

It should however be noted that the processing may include, for example, data conversion, forward error correction (FEC), rate adaptation, quadrature phase shift keying (QPSK) modulation etc. In addition, processing unit/logic 732 may also process control messages and/or data messages received from transceivers 720 and/or interface 740. Memory 734 may include a RAM, a ROM, and/or another type of memory to store data and instructions that may be used by processing unit/logic 732.

Interface 740 may include one or more line cards that allow RN 700 to transmit data to and receive data from other devices over wired and/or wireless connections. The interface 740 may also include an X2 interface to communicate with eNB(s). The RN 700 may perform certain operations in response to processing unit/logic 732 executing software instructions contained in a computer-readable medium, such as memory 734. A computer-readable medium may be defined as one or more physical and/or logical memory devices. The software instructions may be read into memory 734 from another computer-readable medium or from another device via interface 740. The software instructions contained in memory 734 may cause processing unit/logic 732 to perform processes described herein. Alternatively, hardwired circuitry may be used in place of or in combination with software instructions to implement processes/function/method described herein. Thus, embodiments described herein are not limited to any specific combination of hardware circuitry and software.

Although FIG. 7 shows exemplary components of RN 700, in other implementations, RN 700 may contain fewer, different, or additional components than depicted in FIG. 7. In still other implementations, one or more components of RN 700 may perform the tasks described as being performed by one or more other components of RN 700.

The present invention and its exemplary embodiments can be realized in many ways. For example, one embodiment of the present invention includes a computer-readable medium having instructions stored thereon that are executable by a eNB and/or a RN of a telecommunications LTE based system e.g. LTE-advanced. The instructions executable by eNB and/or the RN and stored on a computer-readable medium perform the method steps of the present invention as previously described.

While the invention has been described in terms of several preferred embodiments, it is contemplated that alternatives, modifications, permutations and equivalents thereof will become apparent to those skilled in the art upon reading of the specifications and upon study of the drawings. It is therefore intended that the following appended claims include such alternatives, modifications, permutations and equivalents as fall within the scope of the present invention.

The invention claimed is:

1. A method for coordinating interference between at least one relay node (RN) and at least one macro radio base station serving said at least one RN and wherein said at least one RN and said at least one macro radio base station are configured to communicate with each other via at least one predefined layer one (L1) control channel, the method comprising:
    deciding, in said at least one macro radio base station, on what radio resources to schedule to at least one user equipment, UE, served by the macro radio base station and deciding on what radio resources to leave unutilized; and
    transmitting to said at least one RN, via said at least one predefined L1 control channel, an interference coordination signalling message comprising information on said decided radio resources, to assist said at least one RN to make an own scheduling decision based on the information in the interference coordination signalling message, the interference coordination signalling message further indicating a time span over which said interference information in the interference coordination signalling message applies, wherein said transmitting comprises selecting to transmit the interference coordination signalling message via either the predefined L1 control channel corresponding to a relay physical downlink control channel (R-PDCCH) or via the predefined L1 channel corresponding to a physical broadcast channel (PBCH) if the same interference coordination signalling message is to be transmitted to a plurality of relay nodes served by the macro radio base station.

2. The method according to claim 1, further comprising adjusting what radio resources to leave unutilized, based on feedback received from said at least one RN.

3. The method according to claim 1, wherein said transmitting comprises including in the interference coordination signalling message at least one of: a scheduling restriction to at least one interfered RN; and an unrestricted scheduling command to at least one un-interfered RN.

4. The method according to claim 1, further comprising indicating in said interference coordination signalling message at least one transmission parameter including information about a used or recommended pre-coding matrix or transport format.

5. A method for coordinating interference between at least one relay node (RN) and at least one macro radio base station serving said at least one RN and wherein said at least one RN and said at least one macro radio base station are configured to communicate with each other via at least one predefined layer one (L1) control channel, the method comprising:
    deciding, in said at least one macro radio base station, on what radio resources to schedule to at least one user equipment, UE, served by the macro radio base station and deciding on what radio resources to leave unutilized; and
    transmitting to said at least one RN, via said at least one predefined L1 control channel, an interference coordination signalling message comprising information on said decided radio resources, to assist said at least one RN to make an own scheduling decision based on the information in the interference coordination signalling message, the interference coordination signalling message further indicating a time span over which said interference information in the interference coordination signalling message applies, wherein said transmitting comprises selecting to transmit the interference coordination signalling message via the predefined L1 control channel corresponding to a physical broadcast channel (PBCH) if another predefined L1 control channel corresponding to a relay physical downlink control channel (R-PDCCH) is limited in capacity or is not fast enough.

6. A method for coordinating interference between at least one relay node (RN) and at least one macro radio base station serving said at least one RN and wherein said at least one RN and said at least one macro radio base station are configured to communicate with each other via at least one predefined layer one (L1) control channel, the method comprising:
- deciding, in said at least one macro radio base station, on what radio resources to schedule to at least one user equipment, UE, served by the macro radio base station and deciding on what radio resources to leave unutilized; and
- transmitting to said at least one RN, via said at least one predefined L1 control channel, an interference coordination signalling message comprising information on said decided radio resources, to assist said at least one RN to make an own scheduling decision based on the information in the interference coordination signalling message, the interference coordination signalling message further indicating a time span over which said interference information in the interference coordination signalling message applies, wherein said transmitting comprises selecting to transmit the interference coordination signalling message via the predefined L1 control channel corresponding to a relay physical downlink control channel (R-PDCCH) if said signalling message is different for different relay nodes.

7. A method for coordinating interference between at least one relay node (RN) and at least one macro radio base station serving said at least one RN and wherein said at least one RN and said at least one macro radio base station are configured to communicate with each other via at least one predefined layer one (L1) control channel, the method comprising:
- deciding, in said at least one macro radio base station, on what radio resources to schedule to at least one user equipment, UE, served by the macro radio base station and deciding on what radio resources to leave unutilized; and
- transmitting to said at least one RN, via said at least one predefined L1 control channel, an interference coordination signalling message comprising information on said decided radio resources, to assist said at least one RN to make an own scheduling decision based on the information in the interference coordination signalling message, the interference coordination signalling message further indicating a time span over which said interference information in the interference coordination signalling message applies, wherein said transmitting comprises selecting to transmit the interference coordination signalling message via the predefined L1 channel corresponding to a relay physical downlink control channel (R-PDCCH) if another predefined L1 control channel corresponding to a physical broadcast channel (PBCH) is limited in capacity or is not fast enough.

8. A method for coordinating interference between at least one relay node (RN) and at least one macro radio base station serving said at least one RN and wherein said at least one RN and said at least one macro radio base station are configured to communicate with each other via at least one predefined layer one (L1) control channel, the method comprising:
- deciding, in said at least one macro radio base station, on what radio resources to schedule to at least one user equipment, UE, served by the macro radio base station and deciding on what radio resources to leave unutilized;
- transmitting to said at least one RN, via said at least one predefined L1 control channel, an interference coordination signalling message comprising information on said decided radio resources, to assist said at least one RN to make an own scheduling decision based on the information in the interference coordination signalling message, the interference coordination signalling message further indicating a time span over which said interference information in the interference coordination signalling message applies; and
- further comprising at least one of: indicating in the interference coordination signalling message a level of transmission power on each scheduled radio resource; and indicating a level of interference that can be tolerated or that is caused on said decided radio resources.

9. A method in a relay node (RN) for coordinating interference between the RN and at least one macro radio base station serving said RN and wherein said RN and said at least one macro radio base station are configured to communicate with each other via at least one predefined layer one (L1) control channel, the method comprising:
- receiving, via the predefined L1 control channel corresponding to a relay physical downlink control channel (R-PDCCH) or via the predefined L1 control channel corresponding to a physical broadcast channel (PBCH), an interference coordination signalling message comprising information on what radio resources that the macro radio base station decided to schedule to at least one user equipment (UE) served by the macro radio base station and further comprising information on what radio resources that the macro radio base station decided to leave unutilized, the interference coordination signalling message further indicating a time span over which said interference information in the interference coordination signalling message applies; and
- scheduling radio resources to UEs served by the RN based on the information received in the interference coordination signalling message.

10. A macro radio base station for coordinating interference between said macro radio base station and at least one relay node (RN) served by said macro radio base station and wherein said at least one RN and said macro radio base station are configured to communicate with each other via at least one predefined layer one (L1) control channel, the macro radio base station comprising:
- a scheduler configured to decide on what radio resources to schedule to at least one user equipment (UE) served by the macro radio base station and further configured to decide on what radio resources to leave unutilized; and
- a transmitter configured to transmit to said at least one RN, via said at least one predefined L1 control channel, an interference coordination signalling message comprising information on said decided radio resources, to assist said at least one RN to make an own scheduling decision based on the information in the interference coordination signalling message, wherein the transmitter is further configured to indicate in the interference coordination signalling message a time span over which said interference information in the interference coordination signalling message applies, and
- wherein the macro radio base station is configured to select to transmit the interference coordination signalling message via either the predefined L1 control channel corresponding the to a relay physical downlink control channel (R-PDCCH), or via the predefined L1 control channel corresponding to a physical broadcast channel (PBCH), if the same interference coordination signalling message is to be transmitted to a plurality of RNs served by the macro radio base station.

11. The macro radio base station according to claim 10, further configured to adjust what radio resources are left unutilized, based on feedback received from said at least one RN.

12. The macro radio base station according to claim 10, wherein the transmitter is further configured to include in the interference coordination signalling message at least on of: a scheduling restriction to at least one interfered RN; and an unrestricted scheduling command to at least one un-interfered RN.

13. The macro radio base station according to claim 10, wherein the transmitter is further configured to indicate in said interference coordination signalling message at least one transmission parameter including information about a used or recommended pre-coding matrix or transport format.

14. A macro radio base station for coordinating interference between said macro radio base station and at least one relay node (RN) served by said macro radio base station and wherein said at least one RN and said macro radio base station are configured to communicate with each other via at least one predefined layer one (L1) control channel, the macro radio base station comprising:
 a scheduler configured to decide on what radio resources to schedule to at least one user equipment (UE) served by the macro radio base station and further configured to decide on what radio resources to leave unutilized; and
 a transmitter configured to transmit to said at least one RN, via said at least one predefined L1 control channel, an interference coordination signalling message comprising information on said decided radio resources, to assist said at least one RN to make an own scheduling decision based on the information in the interference coordination signalling message, and wherein the transmitter is further configured to indicate in the interference coordination signalling message a time span over which said interference information in the interference coordination signalling message applies; and
 wherein the macro base station is configured to select to transmit the interference coordination signalling message via the predefined L1 control channel corresponding to a physical broadcast channel (PBCH), if another predefined L1 control channel corresponding to a relay physical downlink control channel (R-PDCCH), is limited in capacity or is not fast enough.

15. A macro radio base station for coordinating interference between said macro radio base station and at least one relay node (RN) served by said macro radio base station and wherein said at least one RN and said macro radio base station are configured to communicate with each other via at least one predefined layer one (L1) control channel, the macro base station comprising:
 a scheduler configured to decide on what radio resources to schedule to at least one user equipment (UE) served by the macro radio base station and further configured to decide on what radio resources to leave unutilized; and
 a transmitter configured to transmit to said at least one RN, via said at least one predefined L1 control channel, an interference coordination signalling message comprising information on said decided radio resources, to assist said at least one RN to make an own scheduling decision based on the information in the interference coordination signalling message, and wherein the transmitter is further configured to indicate in the interference coordination signalling message a time span over which said interference information in the interference coordination signalling message applies; and
 wherein the macro radio base station is configured to select to transmit the interference coordination signalling message via the predefined L1 control channel corresponding to a relay physical downlink control channel (R-PDCCH), if said signalling message is different for different RNs.

16. A macro radio base station for coordinating interference between said macro radio base station and at least one relay node (RN) served by said macro radio base station and wherein said at least one RN and said macro radio base station are configured to communicate with each other via at least one predefined layer one (L1) control channel, the macro base station comprising:
 a scheduler configured to decide on what radio resources to schedule to at least one user equipment (UE) served by the macro radio base station and further configured to decide on what radio resources to leave unutilized; and
 a transmitter configured to transmit to said at least one RN, via said at least one predefined L1 control channel, an interference coordination signalling message comprising information on said decided radio resources, to assist said at least one RN to make an own scheduling decision based on the information in the interference coordination signalling message, and wherein the transmitter is further configured to indicate in the interference coordination signalling message a time span over which said interference information in the interference coordination signalling message applies; and
 wherein the macro radio base station is configured to select to transmit the interference coordination signalling message via the predefined L1 control channel corresponding to a relay physical downlink control channel (R-PDCCH), if another predefined L1 control channel corresponding to a physical broadcast channel (PBCH), is limited in capacity or is not fast enough.

17. A macro radio base station for coordinating interference between said macro radio base station and at least one relay node (RN) served by said macro radio base station and wherein said at least one RN and said macro radio base station are configured to communicate with each other via at least one predefined layer one (L1) control channel, the macro radio base station comprising:
 a scheduler configured to decide on what radio resources to schedule to at least one user equipment (UE) served by the macro radio base station and further configured to decide on what radio resources to leave unutilized; and
 a transmitter configured to transmit to said at least one RN, via said at least one predefined L1 control channel, an interference coordination signalling message comprising information on said decided radio resources, to assist said at least one RN to make an own scheduling decision based on the information in the interference coordination signalling message, and wherein the transmitter is further configured to indicate in the interference coordination signalling message a time span over which said interference information in the interference coordination signalling message applies and further to indicate in the interference coordination signalling message at least one of: a level of transmission power on each scheduled radio resource; and a level of interference that can be tolerated or that is caused on said decided radio resources.

18. A relay node (RN) for coordinating interference between the RN, and at least one macro radio base station serving said RN and wherein said the RN and said at least one macro radio base station are configured to communicate with each other via at least one predefined layer one (L1) control channel, the RN comprising:
 a receiver configured to receive, via the predefined L1 control channel corresponding to a relay physical downlink control channel (R-PDCCH) or via the predefined L1 control channel corresponding to a physical broadcast channel (PBCH), an interference coordination signalling message comprising information on what radio resources that the macro radio base station decided to schedule to at least one user equipment (UE) served by the macro radio base station and further comprising information on what radio resources that the macro radio base station decided to leave unutilized, the interference coordination signalling message further indicating a time span over which said interference information in the interference coordination signalling message applies; and a scheduler configured to schedule radio resources to UEs served by the RN based on the information received in the interference coordination signalling message.

* * * * *